United States Patent Office 3,406,216

Patented Oct. 15, 1968

3,406,216

PREPARATION OF CARBON TETRACHLORIDE FROM PHOSGENE

John W. Ager, Jr., Princeton, N.J., assignor to FMC Corporation, New York, N.Y., a corporation of Delaware No Drawing. Filed Nov. 15, 1965, Ser. No. 507,659
10 Claims. (Cl. 260—664)

This invention relates to a process for preparing carbon tetrachloride from phosgene, and more particularly to a novel catalyst for use in the production of carbon tetrachloride from phosgene.

At present there are two processes being used commercially for the production of carbon tetrachloride. In one process, carbon tetrachloride is produced by the chlorination of methane. This process has the disadvantage of producing four moles of hydrogen chloride for each mole of carbon tetrachloride, and thus requires that the producer make some provision for utilizing the by-product hydrogen chloride. The other commercial process for the production of carbon tetrachloride involves the reaction of carbon bisulfide and chlorine and produces sulfur as a by-product. The principal disadvantage of this process is the high capital investment involved in producing carbon bisulfide.

It has been suggested that carbon tetrachloride can be produced from phosgene in accordance with the equation $$2COCl_2 \rightarrow CCl_4 + CO_2$$

Theoretically this is a cheap process, since phosgene is readily made by burning carbon in chlorine and air.

Various workers in the field have indeed made this reaction proceed by the use of a wide variety of catalyst at various temperatures. In U.S. Patent No. 2,892,875 the use of a Friedel-Crafts catalyst at high pressures and temperatures is suggested. In U.S. Patent No. 3,069,481 the use of activated carbon, preferably in conjunction with the halide of transition metal, is suggested. In U.S. Patent No. 3,083,241 the use of active carbon with certain carbides and transition metals is taught. In French Patent No. 1,335,178 the use of an oxygen-free catalyst containing tungsten or molybdenum chloride on active charcoal is taught.

The problem with the methods taught in each of these patents is that in order to get satisfactory results, either excessively long residence times are required which limits the process to batch operation or excessively high temperatures, of the order of 400° C., are necesary. Since the rate of corrosion at high temperatures is notoriously high, it is very desirable to find a process which produces good reaction rates at lower temperatures.

An improved process for the conversion of phosgene to carbon tetrachloride in the presence of aluminum chloride and a chloride of tungsten or molybdenum is described in my copending application Ser. No. 391,313, filed Aug. 21, 1964, now abandoned. In accordance with that process yields of 75% and over, based on the phosgene converted, are obtained in 15 minutes at 250° C. However, that process has the disadvantage that the aluminum chloride component of the catalyst is extremely volatile under the reaction conditions, having a vapor pressure of about 1500 pounds per square inch at 300° C. Thus, the aluminum chloride must be recovered by condensation of the effluent and recycled to the reactor. Such a process is rather expensive and results in high losses of valuable catalyst.

It is an object of this invention to provide an economical process for the conversion of phosgene to carbon tetrachloride. Another object is to provide an efficient process for the conversion of phosgene to carbon tetrachloride with a catalyst which is essentially non-volatile at the reaction conditions. Still another object is to provide a non-volatile catalyst composition which efficiently converts phosgene to carbon tetrachloride. These and other objects will become apparent from the following description of this invention.

It has now been discovered that all of the deficiencies of the prior art can be overcome by converting phosgene to carbon tetrachloride at a temperature of 200–400° C. in the presence of at least 10% by weight, based on the phosgene, of a catalyst comprising one part by weight of tungsten hexachloride or molybdenum pentachloride and 1–20 parts by weight of calcium, strontium, barium or zinc chloroaluminate. The indicated chloroaluminates have been found to be catalytically as active as aluminum chloride but are essentially non-volatile under the reaction conditions. For example calcium chloroaluminate has a vapor pressure of less than 40 mm. Hg. Accordingly, the process of this invention has all of the advantages of the process of my previous application while overcoming the volatile catalyst problems associated with that process.

The two components of the catalyst composition of this invention act synergisically. Neiher the chloroaluminate nor the chloride of tungsten or molybdenum alone will catalyze the production of carbon tetrachloride from phosgene in good yield at temperatures of the order of 300° C. However, when about 1–20 parts by weight of chloroaluminate are used per part of tungsten hexachloride or molybdenum pentachloride, in total amounts of catalyst as low as about 10% by weight, based on the phosgene, substantial conversion is obtained in a short time, with yields of the order of 75% or more, based on the phosgene converted. Preferably the catalyst composition should contain 5–10 parts by weight of chloroaluminate per part of tungsten hexachloride or molybdenum pentachloride. The preferred catalyst composition contains 1 part of tungsten hexachloride and 5–10 parts of calcium chloroaluminate and gives phosgene conversions of about 47% and yields of about 100% based upon the phosgene converted.

It should be noted that tungsten or molybdenum can be added to the reaction mixture in any form which will react with chlorine to form the chloride—e.g., as the oxide. During the reaction, chlorine is split off from the phosgene and reacts with the tungsten or molybdenum to form tungsten hexachloride or molybdenum pentachloride.

It is not necessary that phosgene be charged to the reactor since it can be formed in situ by the reaction of carbon monoxide and chlorine. It has been found that carbon monoxide and chlorine react to form phosgene in the presence of the catalyst of this invention. Thus, carbon monoxide and chlorine can be charged to the reactor and converted directly to carbon tetrachloride in accordance with this invention in a single reaction step.

The process of this invention is carried out at temperatures of about 200–400° C. At temperatures below about 200° C. the conversion of phosgene is unsuitably low. At temperatures above about 400° C. corrosion due to chlorine is encountered. Preferably temperatures of about 250–350° C. should be employed.

The pressure used in the process of this invention is of relatively little significance and thus can be varied over wide limits. The most important consideration with respect to pressure is to choose a pressure which allows the reaction to be carried out in a continuous manner and simplifies recovery of the products and any volatilized catalyst. Pressures in the range of about 0–1000 p.s.i.g. have been found to be suitable. Preferably pressures of 100–200 p.s.i.g. are employed.

The reaction should be carried out in the presence of at least about 10% by weight catalyst based on the phosgene. When smaller amounts are used, the conversion of phosgene is unsuitably low. For good conversions at least about 25% catalyst, based on the phosgene, should be used and preferably about 50–200%. There is no upper limit on the amount of catalyst employed other than economic considerations. Catalyst loadings as high as about 1000% have been used successfully.

The following examples, illustrating the novel process and catalyst compositions disclosed herein, are given without any intention that the invention be limited thereto. All parts and percentages are by weight.

Example 1

Calcium chloroaluminate was prepared by heating 11.1 parts of anhydrous calcium chloride and 26.6 parts of anhydrous aluminum chloride in a sealed autoclave at 300° C. for 36 hours. The solid calcium chloroaluminate product was crushed to a powder and heated to 305° C. in a sublimator at atmospheric pressure to remove the excess aluminum chloride.

A mixture containing 21.5 parts of the above calcium chloroaluminate, 3 parts of tungsten hexachloride and 14 parts of phosgene was heated in an autoclave at 300° C. for 15 minutes. The products were 4.9 parts of carbon tetrachloride, 1.3 parts of carbon dioxide and 7.3 parts of phosgene for a 47% conversion of phosgene and a 100% yield of carbon tetrachloride based on the conversion.

Example 2

Strontium chloroaluminate was prepared by heating 158.5 parts of anhydrous strontium chloride with 266.6 parts of aluminum chloride in a sealed autoclave at 300° C. for 48 hours. The strontium chloroaluminate product was powdered and heated at 200° C. under vacuum and then at 310° C. at atmospheric pressure to remove excess aluminum chloride.

A mixture containing 27 parts of strontium chloroaluminate, 3 parts of tungsten hexachloride and 14.7 parts of phosgene was heated in an autoclave at 300° C. for 15 minutes. The products were 1.5 parts of carbon tetrachloride, 1.9 parts of carbon dioxide and 9.1 parts phosgene for a 38% conversion of phosgene and a 68% yield of carbon tetrachloride based on the phosgene converted.

Example 3

Barium chloroaluminate was prepared by mixing together 6.2 parts of anhydrous barium chloride, 8 parts of anhydrous aluminum chloride and 13.7 parts of phosgene in a sealed autoclave at ambient temperature for 18 hours. The solid barium chloroaluminate product was heated to 300° C. to remove the excess aluminum chloride and then placed in an autoclave with 3 parts of tungsten hexachloride and 14.7 parts of phosgene. The mixture was heated at 300° C. for 15 minutes. The result was a 27% conversion of phosgene and a 30% yield of carbon tetrachloride based on the phosgene converted.

Example 4

A mixture of 7 parts of zinc chloride, 8 parts of aluminum chloride, 3 parts of tungsten hexachloride and 13.7 parts of phosgene was heated in an autoclave at 300° C. for 15 minutes. The result was a 70% conversion of phosgene and an 88% yield of carbon tetrachloride based on the phosgene converted.

Example 5

A mixture of 10 parts of calcium chloroaluminate, 1.5 parts of molybdenum pentachloride, and 14 parts of phosgene was heated in an autoclave at 300° C. for 15 minutes. The result was a 20% conversion of phosgene and a 58% yield of carbon tetrachloride based on the phosgene converted.

Example 6

A clean, stainless steel bomb was charged with 20 parts of calcium chloroaluminate, 2 parts of tungsten hexachloride, 10 parts of chlorine and 4.5 parts of carbon monoxide. The mixture was heated at 300° C. for 15 minutes. The products were carbon tetrachloride, phosgene, carbon dioxide and a small amount of perchloroethylene. Assuming that all the chlorine was converted to phosgene, the result was a 40% conversion of phosgene and a 75% yield of carbon tetrachloride based on the phosgene converted.

As will be apparent to those skilled in the art, numerous modifications and variations in the embodiments illustrated above may be made without departing from the spirit of the invention or the scope of the following claims.

What is claimed is:

1. A process for converting phosgene to carbon tetrachloride which comprises heating phosgene to a temperature of 200–400° C. in the presence of at least 10% by weight, based on the phosgene, of a catalyst comprising 1 part by weight of tungsten hexachloride or molybdenum pentachloride and 1–20 parts by weight of calcium, strontium, barium or zinc chloroaluminate.

2. The process of claim 1 in which the temperature is 250–350° C. and the catalyst is at least 25% of the phosgene.

3. The process of claim 2 in which the catalyst comprises 1 part of tungsten hexachloride and 5–10 parts of calcium chloroaluminate.

4. The process of claim 2 in which the catalyst comprises 1 part of tungsten hexachloride and 5–10 parts of strontium chloroaluminate.

5. The process of claim 2 in which the catalyst comprises 1 part of tungsten hexachloride and 5–10 parts of barium chloroaluminate.

6. The process of claim 2 in which the catalyst comprises 1 part of tungsten hexachloride and 5–10 parts of zinc chloroaluminate.

7. The process of claim 2 in which phosgene is produced in situ by the reaction of carbon monoxide and chloride.

8. A catalyst composition which comprises 1 part by weight of tungsten hexachloride or molybdenum pentachloride and 1–20 parts by weight of calcium, strontium, barium or zinc chloroaluminate.

9. The catalyst composition of claim 7 which comprises 1 part of tungsten hexachloride and 5–10 parts of calcium chloroaluminate.

10. The catalyst composition of claim 7 which comprises 1 part of tungsten hexachloride and 5–10 parts of strontium chloroaluminate.

References Cited

UNITED STATES PATENTS

| | | | |
|---|---|---|---|
| 2,892,875 | 6/1959 | Kung | 260—664 |
| 3,069,481 | 12/1962 | Haszeldine et al. | 260—664 |
| 3,083,241 | 3/1963 | Glemser | 260—664 |

FOREIGN PATENTS

| | | |
|---|---|---|
| 874,552 | 8/1961 | Great Britain. |
| 1,335,178 | 7/1963 | France. |

BERNARD HELFIN, *Primary Examiner.*

T. G. DILLAHUNTY, *Assistant Examiner.*